(12) United States Patent
Root et al.

(10) Patent No.: US 7,770,351 B2
(45) Date of Patent: Aug. 10, 2010

(54) HOUSING WITH A FRONT FRAME COVERING THE HOUSING OPENING

(75) Inventors: Paul Root, Bad Endbach (DE); Markus Neuhof, Ehringshausen-Niederlemp (DE)

(73) Assignee: Rittal GmbH & Co. KG, Herborn (DE)

( * ) Notice: Subject to any disclaimer, the term of this patent is extended or adjusted under 35 U.S.C. 154(b) by 785 days.

(21) Appl. No.: 11/250,175

(22) Filed: Oct. 13, 2005

(65) Prior Publication Data

US 2006/0107577 A1 May 25, 2006

(30) Foreign Application Priority Data

Oct. 15, 2004 (DE) ........................ 10 2004 050 499

(51) Int. Cl.
*E04C 2/38* (2006.01)
(52) U.S. Cl. .................... 52/656.1; 40/780; 40/782; 220/4.02; 52/656.2
(58) Field of Classification Search ............... 40/780, 40/782; 52/656.1, 656.2; 220/3.2, 4.02
See application file for complete search history.

(56) References Cited

U.S. PATENT DOCUMENTS

| | | | | |
|---|---|---|---|---|
| 4,958,259 A | * | 9/1990 | Berg et al. | 361/730 |
| 5,345,722 A | * | 9/1994 | McKann | 49/505 |
| 5,921,050 A | * | 7/1999 | Munch et al. | 52/656.1 |
| 6,138,413 A | * | 10/2000 | Fehr | 49/382 |
| 6,209,269 B1 | * | 4/2001 | Valderrama | 52/171.3 |
| 6,276,099 B1 | * | 8/2001 | O'Shea | 52/204.1 |
| 6,343,448 B1 | * | 2/2002 | Lin | 52/204.1 |
| 6,412,227 B1 | * | 7/2002 | De Zen | 49/504 |
| 6,807,783 B2 | * | 10/2004 | Lee | 52/473 |

FOREIGN PATENT DOCUMENTS

| DE | 41 09 695 C1 | 4/1992 |
|---|---|---|
| DE | 195 25 876 C1 | 12/1996 |

* cited by examiner

*Primary Examiner*—Anthony Stashick
*Assistant Examiner*—Christopher B McKinley
(74) *Attorney, Agent, or Firm*—Pauley Petersen & Erickson

(57) ABSTRACT

A housing with a front frame which covers a housing opening, wherein the front frame is assembled from four frame legs and four corner elements. The corner elements connect the frame legs which meet each other at right angles at the corner elements, with each other. The corner elements can have two walls, extending at right angles in relation to each other, with fastening receivers for screw connections with screw receptacles in the front faces of the frame legs of the front frame. The outsides of these walls facing the frame legs have plug-in and/or snap-in elements, which can be introduced and/or snapped into the plug-in and/or snap-in receptacles of the frame legs. The walls are connected with an outer wall and a rear wall, which complete the outside and rear of the front frame, a simple assembly of the front frame and the rear wall or the basic housing structure is achieved.

18 Claims, 4 Drawing Sheets

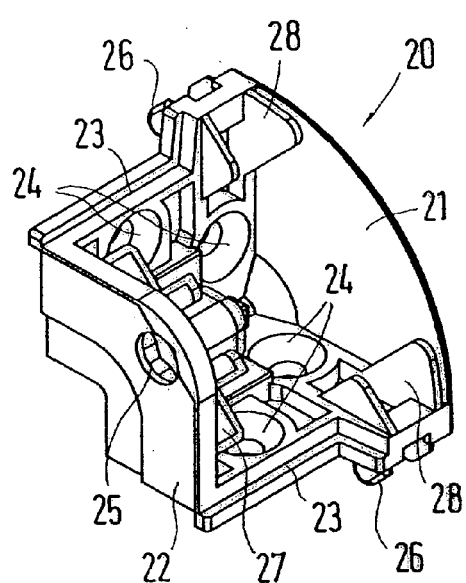
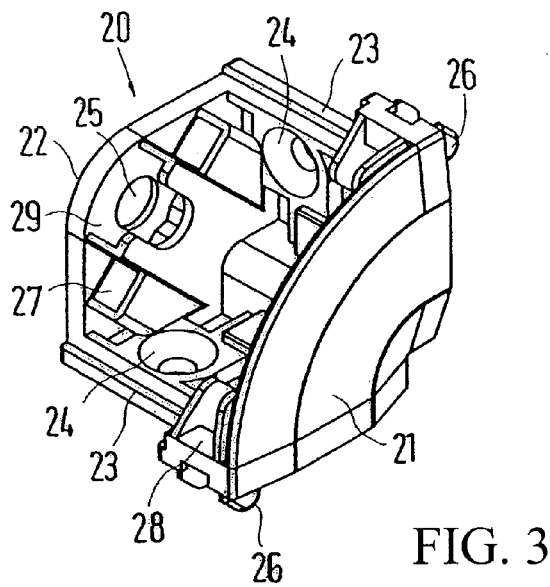
FIG. 2
FIG. 3
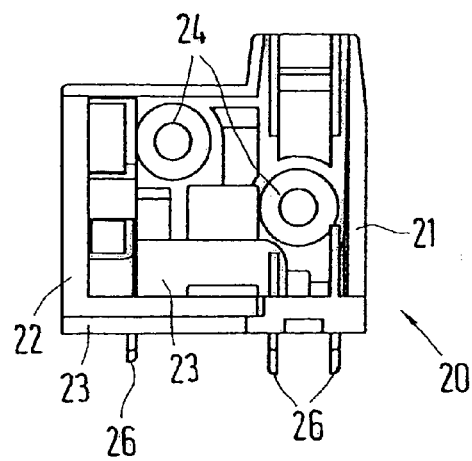
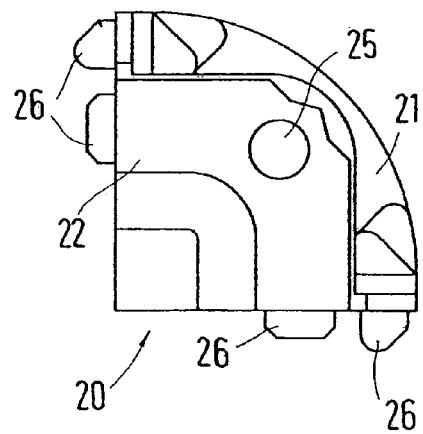
FIG. 4
FIG. 5

HOUSING WITH A FRONT FRAME COVERING THE HOUSING OPENING

BACKGROUND OF THE INVENTION

1. Field of the Invention

This invention relates to a housing with a front frame which covers a housing opening, wherein the front frame is assembled from four frame legs and four corner elements, and the corner elements connect the frame legs, which meet each other at right angles at the corner elements, with each other.

2. Discussion of Related Art

The front frame of such housings performs several functions. For one, the front frame receives fastening elements for attaching a front plate which forms the finish of the housing at the front end, which can be designed in various ways and can have display and operating elements, such as shown in German Patent Reference DE 41 09 695 C1. Also, with an appropriate structural depth, the front frame itself can be used as a housing, which can be closed off at the rear of the front frame by a rear wall which must be connected with the front frame.

As German Patent Reference DE 195 25 876 C1 shows, with a defined layout of the frame legs and of the corner elements of the front frame, as well as of the housing walls constituting the housing opening, the housing opening can also later be provided with the front frame without a large cost outlay associated with additional fastening elements.

SUMMARY OF THE INVENTION

In connection with a housing having a front frame covering the housing opening, it is one object of this invention to design the front frame so that the front frame itself can be used as the housing, or that it can be connected with basic box-like structures of various depths. During this it is intended to use only a few and simple additional fastening elements, and the fastening locations should not be visible from the direction of the front of the housing.

In accordance with this invention, this object is achieved with corner elements having two walls, extending at right angles in relation to each other, with fastening receivers for screw connections with screw receptacles in the front faces of the frame legs of the front frame. The outsides of these walls facing the frame legs have plug-in and/or snap-in elements, which can be introduced and/or snapped into the plug-in and/or snap-in receptacles of the frame legs. These walls are connected with an outer wall and a rear wall, which complete the outside and rear of the front frame.

With this layout of the corner elements and the frame legs of the front frame it is possible to screw the front faces of the frame legs in the corner areas of the front frame together with the walls of the corner elements with simple screw connections. Also, the rear walls of the corner elements provide an opportunity to connect a rear wall or a connectable basic housing structure directly with the front frame. The frame legs with the fastening receivers, plug-in and/or snap-in receptacles can be produced in one piece as extruded profiled sections. Also, the outsides of the frame legs can have outer grooves for the application of elastic strips or lettering strips.

In accordance with a preferred embodiment of this invention, the rear wall can be equipped with a fastening receiver, which makes possible a connection with a rear wall or a box-like housing structure. In one embodiment of this invention, the corner elements which are open towards the corners can be closed off by covering caps having plug-in and/or snap-in elements, which can be plugged and/or snapped into plug-in or snap-in receivers in the walls of the corner elements. The covering caps for the corner elements can simply be pushed on or snapped into the corner elements. In the process, they provide an esthetic finish of the front frame on the visible side.

The outside grooves of the frame legs can also receive handles, accessories and the like, such as with a tongue-and-groove connection between these elements and the receiving groove.

The design of the front frame can be visually more esthetic if the sides of the front wall and the rear wall of the corner elements which face away from the frame legs are rounded, and/or if the covering caps are matched to these rounded parts and rest against them in their plugged and/or snapped-in state.

For the connection of the corner elements with the frame legs of the front frame which meet at right angles, the fastening receivers in the walls of the corner elements are embodied as countersunk head receivers for the heads of countersunk screws, while the arrangement for the rear connection at the front frame can be made so that the fastening receivers in the rear walls of the corner elements are designed as bores for threaded screws or threaded rods, and that these bores on the insides of the walls are surrounded by cages in which a nut for the screw connection can be fixed so it cannot be rotated. In this case, these cages are also produced in one piece with the corner elements, and the rear connections can be easily made when the covering caps are removed.

If the front frame is connected with a basic housing structure, in one embodiment, a basic housing structure, which can be connected with the front frame, includes four housing wall panels and four housing corner elements, wherein the housing corner elements and the housing wall panels are matched to the depth of the box-like basic housing structure and the same connecting technology is used as that for the front frame. This has one advantage in that the fastening elements, the plug-in and/or snap-in elements, as well as the plug-in and/or snap-in receivers, and the assembly steps connected with same, are identical for the front frame as well as for the basic housing structure.

The construction of the front frame and of the basic housing structure becomes even clearer in that the housing corner elements for the basic housing structure are designed with identical front and rear walls provided with aligned bores. The space between the front and the rear wall is divided by separating walls, which have semicircularly-shaped receivers for the threaded rod in the area of the aligned bores. The walls of the housing corner elements in the separate partial spaces facing the housing wall panels have fastening receivers and plug-in and/or snap-in receivers, whose arrangement and layout is identical with the arrangement and layout of the corresponding elements in the corner elements of the front frame. The housing corner elements of the basic housing structure can be covered by housing cover caps, whose connecting technology corresponds to that of the housing wall panels with the corner elements of the front frame.

For esthetic reasons, at least the front side of the front walls of the corner elements and the adjoining outer walls of the covering caps make a flush transition into the front faces of the frame legs of the front frame. The front sides of the front walls of the corner elements make an approximately flush transition with the adjoining front sides of the frame legs of the front frame. The covering caps partially cover at least the front walls of the corner elements and the adjoining front faces of the frame legs of the front frame.

BRIEF DESCRIPTION OF THE DRAWINGS

This invention is explained in greater detail in view of an exemplary embodiment represented in the drawings, wherein:

FIGS. 2 and 3 each shows two perspective plan views of a corner element;

FIG. 4 is a lateral view of the corner element, viewed perpendicularly with respect to a wall which can be connected with the front face of a frame leg, with the elements applied in one piece on the inside of the wall;

FIG. 5 is a plan view of the rear of the corner element with the fastening receiver in the wall;

DETAILED DESCRIPTION OF PREFERRED EMBODIMENTS

Figure 1:
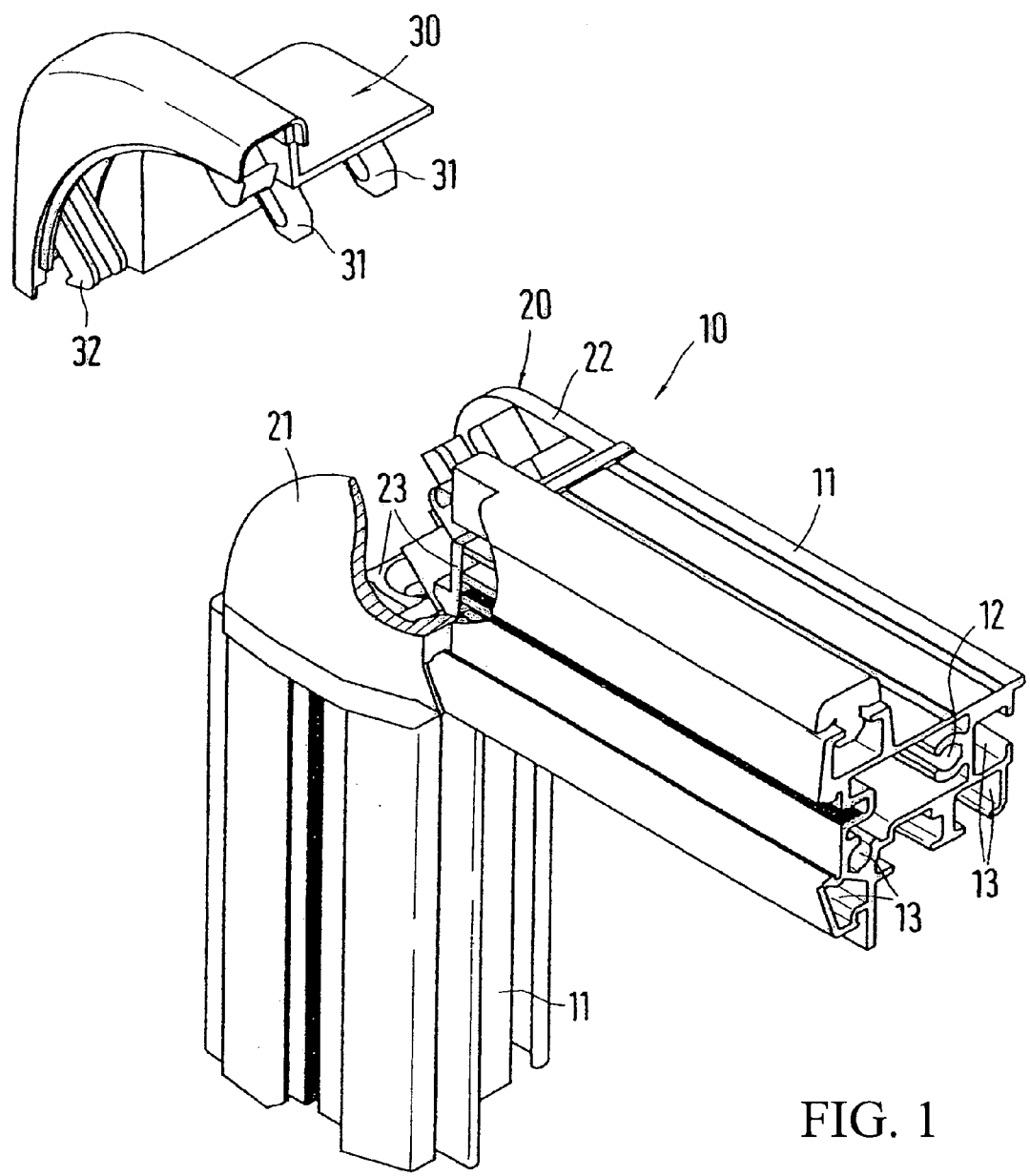
FIG. 1 is an exploded partial view of a corner area of the front frame with a corner element which connects the two frame legs adjoining each other at right angles with each other, and which can be covered by a covering cap.

As shown in the perspective plan view in accordance with FIG. 1, respectively, two frame legs 11 meet at right angles in the corner area of a front frame and are connected with an corner element 20. In this case the frame legs 11 are cut to size regarding width and height from an extruded profiled section to correspond to the dimensions of the front frame 10. As the cross section of the frame leg 11 shows, the required fastening receivers 12 and the plug-in and/or snap-in receivers 13 required for these connections can be made in one piece from the extruded profiled section, so that no additional fastening elements need to be available.

Two walls 23 of the corner element 20 are placed vertically with respect to each other, and their outsides face the front sections of the frame legs 11 and are connected with them, which will be shown later. Laterally with respect to the two walls 23, a front wall 21 and a rear wall 22 form a space open toward the corner, which is closed off by a covering cap 30 once the frame legs 11 are connected with the corner element 20. Plug-in and/or snap-in elements 31 and 32 are formed on the covering cap 30 which, during the plug-in and/or snap-in process, can be inserted and/or snapped into plug-in and/or snap-in receivers formed on or in the insides of the walls 23 of the corner element 20.

The plan views of FIGS. 2 to 5 show the corner element 20 in an embodiment with the elements for attaching the frame legs 11 and the covering cap 30.

In FIGS. 2 and 3, the open space in the corner area is shown, which is formed by the walls 23 extending at right angles with respect to each other for being connected with the frame legs 11 and the front wall 21 and the rear wall 22.

The front wall 21 and the rear wall 22 face the front and rear of the front frame 10 and can adjoin the sides of the front frame 10 flush.

Plug-in and/or snap-in elements 26 are formed on the outsides of the walls 23, which can be inserted and/or snapped into appropriately arranged plug-in and/or snap-in receivers 13 of the frame legs 11. Thus this technology offers many embodiment variations. Furthermore, fastening receivers 24 are formed in the walls 23 of the corner element 20, which can receive a head of a countersunk screw. These countersunk screws can be screwed into fastening receivers 12 of the frame legs 11. The rear wall 22 of the corner element 20 has a fastening receiver 25 designed as a bore, so that at these locations the front frame 10 can be directly connected with a rear wall or a basic housing structure in accordance with FIG. 7. It is possible with the plug-in and/or snap-in elements 26 on the outsides of the walls 23 of the corner element 20 to produce a sort of preparatory assembly position between the corner element 20 and the frame legs 11, which are then fixed in place by the screw connections via the fastening receivers 24 and 12 of the corner element 20 and the frame leg 11.

Figures 6, 7:
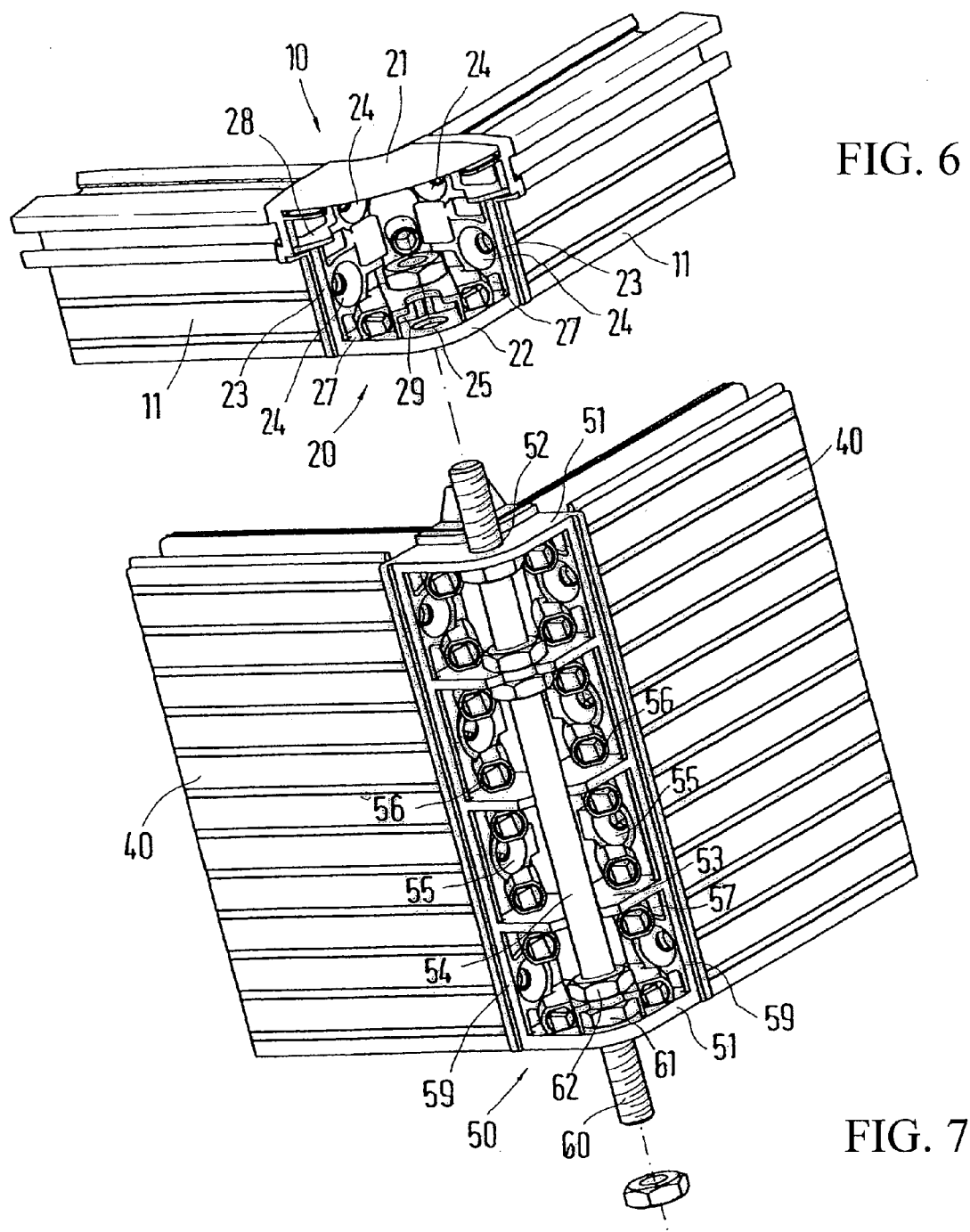
FIG. 6 is a perspective plan view of the open side of the corner element with the two frame legs to be attached to the walls.
FIG. 7 is a perspective plan view of a housing corner area of a basic housing structure with housing corner elements and housing wall panels.

As shown in FIG. 6, the insides of the walls 23 have plug-in and/or snap-in receivers 27 and 28 for the plug-in and/or snap-in elements 31 and 32 of the covering caps 30, so that the latter can be placed on and/or snapped into the open corner areas of the preassembled front frame 10. In the process, the covering cap 30 rests against the rounded outsides of the front wall 21 and the rear wall 22. Thus, the covering cap 30 can adjoin the front and rear of the front frame 10 flush, or can partially overlap it.

The corner area of a basic housing structure, assembled from housing wall panels 40 and housing corner elements 50, is shown in a perspective view in FIG. 7. The dimensions of the housing wall panels 40 and the housing corner elements 50 are matched to the depth of the box-like housing. The housing corner element 50 includes the walls 59 extending at right angles to each other, which are connected with the housing wall panels 40. As shown by the fastening receivers 55, the same connecting techniques as with the corner element 20 and the frame leg 11 of the front frame 10 are used. The walls 51 of the housing corner element 50 are identically rounded and have a fastening receiver 52 embodied as a bore. The fastening receivers 52 are aligned with each other and can receive a threaded rod 60. The space between the parallel walls 51 of the housing corner element 50 is divided by separating walls 53, which support semicircularly-shaped receivers 54 as supports for the threaded rod 60.

Figure 8:
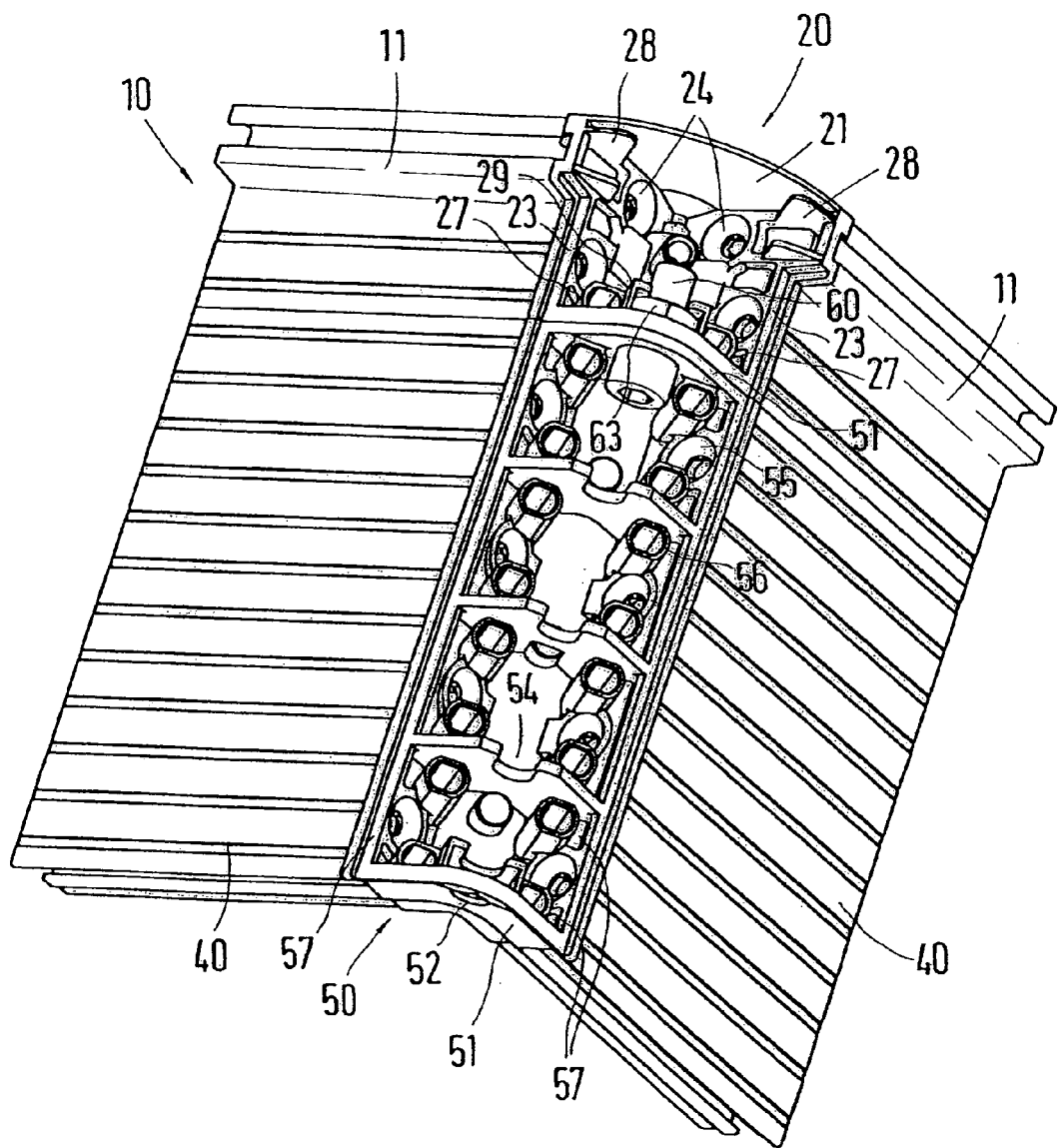
FIG. 8 is a perspective plan view of the corner area of a housing put together from a front frame, as shown in FIG. 6, and a basic housing structure, as shown in FIG. 7.

Plug-in and/or snap-in receivers 56 and 57 are placed into the partial spaces of the housing corner element 50 and are used for attaching a housing covering cap. The threaded rod 60 can be fixed in place in the housing corner element 50 by nuts 61 and 62 so that it cannot be axially displaced, but can be rotated. The threaded rod 60 can be introduced through the fastening receiver 25 in the rear wall 22 of a corner element 20 of the front frame 10 and fixed in place by a nut 63, which is maintained in a manner in which it cannot be turned in a cage 29 around the fastening receiver 25 in the corner element 20. The basic housing structure can be connected in this way with the front frame 10 by turning the threaded rod 60, as shown in FIG. 8. In this case the housing corner element 50 can also be connected directly with the corner element 20 of the front frame 10 via a fastening screw, which is guided in a sleeve-shaped element formed on the facing wall 51.

German Patent Reference 10 2004 050499.7-26, the priority document corresponding to this invention, and its teachings are incorporated, by reference, into this specification.

What is claimed is:

1. A housing with a front frame which covers a housing opening, wherein the front frame is assembled from four frame legs and four corner elements, and the corner elements connect the frame legs which meet each other at right angles at the corner elements with each other, the housing comprising:

the corner elements (20) each having two side walls (23) extending at a right angle relative to each other;

the corner elements (20) each further including a front wall (21) and an opposing rear wall (22), wherein the two side walls (23) are disposed between the outer wall (21) and the opposing rear wall (22);

the corner elements (20) each being open at one of a corner or sides opposite the two side walls (23);

the side walls (23) each having an outside surface facing and abutting an adjacent end of one of the frame legs, the outside surface including at least one of plug-in elements or snap-in elements (26) which can be at least one of introduced or snapped into at least one of plug-in receptacles or snap-in receptacles (13) of the frame legs (11), and the outside surface further including a fastening receiver (24) for a screw connection with a corresponding screw receptacle (12) in the adjacent end of the one of the frame legs (11);

the side walls (23) each having an inside surface opposite the outside surface and including a plug-in receiver or a snap-in receiver (27, 28) for connecting a covering cap to close the corner or sides opposite the two side walls (23); and the rear wall (22) including a fastening receiver (25) designed as a bore for a threaded screw or a threaded rod extending there through for connecting to a further element of the housing.

2. The housing in accordance with claim 1, further comprising covering caps (30) having at least one of second plug-in elements and second snap-in elements (31, 32) which can be at least one of plugged or snapped into one of the plug-in receivers or snap-in receivers (27, 28).

3. The housing in accordance with claim 2, wherein sides of the front wall (21) and the rear wall (22) of the corner elements (20) which face away from the frame legs (11) are rounded and the covering caps (30) are matched to and rest against rounded parts formed when in at least one of a plugged-in state and a snapped-in state.

4. The housing in accordance with claim 3, wherein the bores on the insides of the walls are surrounded by cages (29) in which a nut (63) for a screw connection is fixed to prevent rotation.

5. The housing in accordance with claim 4, wherein a basic housing structure connectible with the front frame (10) comprises four housing wall panels (40) and four housing corner elements (50), wherein the housing corner elements (50) and the housing wall panels (40) are matched to a depth of a box-like basic shape of the housing.

6. The housing in accordance with claim 5, wherein the housing corner elements (50) for a basic housing structure are designed with identical ones of front walls and rear walls (51) having aligned bores, a space between each of the front and the rear wall (51) is divided by separating walls (53) having semicircularly-shaped receivers (54) for a threaded rod (60) near the aligned bores (52), and walls (59) of the housing corner elements (60) in the separate partial spaces facing the housing wall panels (40) have fastening receivers (55) and at least one of third plug-in receivers and third snap-in receivers (56, 57) arranged identical with an arrangement and layout of corresponding elements in the corner elements (20) of the front frame (10).

7. The housing in accordance with claim 5, wherein the housing corner elements of the basic housing structure are coverable by housing cover caps.

8. The housing in accordance with claim 7, wherein at least front sides of the front walls (21) of the corner elements (20) and the adjoining outer walls of the covering caps (30) make a flush transition into the front faces of the frame legs (11) of the front frame (10).

9. The housing in accordance with claim 8, wherein front sides of the front walls (21) of the corner elements (20) make an approximately flush transition with the adjoining front sides of the frame legs (11) of the front frame (10), and the covering caps (30) partially cover at least the front walls (21) of the corner elements (20) and the adjoining front faces of the frame legs (11) of the front frame (10).

10. The housing in accordance with claim 1, wherein sides of the front wall (21) and the rear wall (22) of the corner elements (20) which face away from the frame legs (11) are rounded and covering caps (30) are matched to and rest against rounded parts formed when in at least one of a plugged-in state and a snapped-in state.

11. The housing in accordance with claim 1, wherein the bores on the insides of the walls are surrounded by cages (29) in which a nut (63) for a screw connection is fixed to prevent rotation.

12. The housing in accordance with claim 1, wherein a basic housing structure connectible with the front frame (10) comprises four housing wall panels (40) and four housing corner elements (50), wherein the housing corner elements (50) and the housing wall panels (40) are matched to a depth of a box-like basic shape of the housing.

13. The housing in accordance with claim 1, wherein at least front sides of front walls (21) of the corner elements (20) and the adjoining outer walls of covering caps (30) make a flush transition into the front faces of the frame legs (11) of the front frame (10).

14. The housing in accordance with claim 1, wherein front sides of the front walls (21) of the corner elements (20) make an approximately flush transition with the adjoining front sides of the frame legs (11) of the front frame (10), and the covering caps (30) partially cover at least the front walls (21) of the corner elements (20) and the adjoining front faces of the frame legs (11) of the front frame (10).

15. A housing with a front frame which covers a housing opening, wherein the front frame is assembled from four frame legs and four frame corner elements, and the frame corner elements connect the frame legs which meet each other at right angles at the frame corner elements with each other, the housing comprising:

a housing structure including two wall panels (40) each connected to one of two perpendicular wall elements (59) of a housing corner element (50);

the housing corner element (50) further comprising a front wall at a first end of the two perpendicular wall elements (59), a rear wall (51) at a second end of the two perpendicular wall elements (59), and a bore in each of the front wall and the rear wall, wherein the bore in the front wall aligns with the bore in the rear wall (51);

a frame corner element (20) having two walls (23) extending at right angles relative to each other, with fastening receivers (24) for screw connections with screw receptacles (12) in the front faces of the frame legs (11) of the front frame (10), and outsides of the walls (23) facing the frame legs (11) having at least one of plug-in elements or snap-in elements (26) which can be at least one of introduced or snapped into at least one of plug-in receptacles and snap-in receptacles (13) of the frame legs (11);

the walls (23) connected with an outer wall (21) and a rear wall (22) to complete an outside and a rear of the front frame (10), the rear wall (22) having a fastening receiver

(25) designed as a bore, wherein the rear wall is connected to a corresponding one of the front or rear wall of the housing corner element by a threaded screw or a threaded rod.

16. The housing in accordance with claim 15, the housing corner element further comprising a separating wall with a semicircularly-shaped receiver (54), the separating wall positioned between the front wall and the rear wall (51) with the semicircularly-shaped receiver aligned with the bore in the front wall and the bore in the rear wall.

17. The housing in accordance with claim 3, wherein the frame legs (11) comprise extruded profiled sections each having screw receivers (12) and the at least one of the plug-in receivers or the snap-in receivers (13) are formed as one piece.

18. The housing in accordance with claim 1, wherein the frame legs (11) comprise extruded profiled sections each having screw receivers (12) and the at least one of the plug-in receivers or the snap-in receivers (13) are formed as one piece.

* * * * *